United States Patent
D'Angelico et al.

(10) Patent No.: US 7,513,151 B2
(45) Date of Patent: Apr. 7, 2009

(54) PROTECTION AGAINST THE EFFECTS OF CONDENSATE BRIDGES

(75) Inventors: Sascha D'Angelico, Efringen-Kirchen (DE); Sergej Lopatin, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 206 days.

(21) Appl. No.: 10/546,763

(22) PCT Filed: Feb. 12, 2004

(86) PCT No.: PCT/EP2004/001310

§ 371 (c)(1),
(2), (4) Date: Jul. 28, 2006

(87) PCT Pub. No.: WO2004/075417

PCT Pub. Date: Sep. 2, 2004

(65) Prior Publication Data

US 2006/0284626 A1    Dec. 21, 2006

(30) Foreign Application Priority Data

Feb. 24, 2003 (DE) .......................... 103 08 087

(51) Int. Cl.
*G01F 23/00* (2006.01)

(52) U.S. Cl. .................................. 73/290 R; 73/290 V

(58) Field of Classification Search ............... 73/290 R, 73/290 V; 340/618, 620, 621; 310/318, 319
See application file for complete search history.

(56) References Cited

U.S. PATENT DOCUMENTS

| 4,896,536 | A | * | 1/1990 | Benz | 73/290 V |
| 5,060,484 | A | * | 10/1991 | Bush et al. | 62/137 |
| 5,631,609 | A | * | 5/1997 | Oka et al. | 331/68 |
| 5,717,383 | A | * | 2/1998 | Dreyer et al. | 73/290 R |
| 6,845,663 | B2 | * | 1/2005 | Lopatin et al. | 73/290 V |
| 7,355,321 | B2 | * | 4/2008 | Yamashita | 310/316.01 |

* cited by examiner

*Primary Examiner*—Hezron Williams
*Assistant Examiner*—Samir M Shah
(74) *Attorney, Agent, or Firm*—Bacon & Thomas, PLLC

(57) ABSTRACT

Apparatus for measuring and/or monitoring a process variable of a medium. The apparatus includes: an oscillatable unit; a driver/receiver unit, which excites the oscillatable unit to oscillate, and/or which receives its oscillations; a control/evaluation unit, which controls the driver/receiver unit, and/or which evaluates the oscillations of the oscillatable unit; and at least one transmitting line and one receiving line between the control/evaluation unit and the driver/receiver unit. At least a third line is provided, which is embodied and arranged in a manner such that it is located between the transmitting line and the receiving line, and is connected with a voltage source, which has an output impedance, which is smaller than the impedance of a condensate bridge.

6 Claims, 6 Drawing Sheets

PROTECTION AGAINST THE EFFECTS OF CONDENSATE BRIDGES

FIELD OF THE INVENTION

The present invention relates to an apparatus for measuring and/or monitoring a physical or chemical process variable of a medium.

BACKGROUND OF THE INVENTION

The apparatus includes: an oscillatable unit; a driver/receiver unit, which has at least one signal input and one signal output, and which excites the oscillatable unit to oscillate, and/or which receives its oscillations; a control/evaluation unit, which has at least one signal input and one signal output, which controls the driver/receiver unit, and/or which evaluates the oscillations of the oscillatable unit; and at least one transmitting line and one receiving line between the control/evaluation unit and the driver/receiver unit; with the transmitting line being connected with the signal output of the control/evaluation unit and the signal input of the driver/receiver unit; and with the receiving line being connected with the signal output of the driver/receiver unit and the signal input of the control/evaluation unit. The process variables can be e.g. fill level, viscosity, density, pressure, temperature or the pH of the medium.

Measuring devices for the measuring and/or monitoring of the fill level of a medium in a container are available from the assignee under the mark "Liquiphant". The principle of construction explained in the following for such measuring devices is, however, also true for similar measuring devices. Such a measuring device is usually composed of an oscillatable unit, a driver/receiver unit and a control/evaluation unit. The driver/receiver unit excites the oscillatable unit—in the case of the Liquiphant device, this is a tuning fork—to oscillate and receives the oscillations of the oscillatable unit. The frequency of the oscillations depends e.g. on whether the oscillatable unit is oscillating in air or, instead, is covered by medium. On this basis, the degree of covering can be deduced from the frequency. The same can likewise be derived from the amplitude; usually, however, the frequency is evaluated. In the driver/receiver unit, for example at least one piezoelectric element can be present, which converts an electric signal into a mechanical oscillation, which is then transmitted via a suitable membrane to the oscillatable unit. Corresponding considerations hold for the conversion of the mechanical oscillation into an electrical signal. A feedback electronics, which, in turn, amplifies and feeds back the signal of the oscillatable unit, and the electronics for evaluating the oscillation are combined in a control/evaluation unit. This control/evaluation unit is usually farther removed from the actual process, in order e.g. better to protect the electronics against the influences of the medium, e.g. high temperature. Usually located between the driver/receiver unit and the control/evaluation unit are at least two electric lines: a transmitting line and a receiving line. Mostly, there is also a ground cable, which likewise is extended to the driver/receiver unit. On the lines, the exciting signal reaches the driver/receiver unit, and the received signal reaches the control/evaluation unit. Depending on the requirements of the container or the plant to be monitored, these lines can be up to several meters long. In most cases, some type of tube surrounds these usually insulated lines, for their further protection. Therefore, the section between driver/receiver unit and control/evaluation unit is also mostly designated to be a tube extension. Fundamentally, despite all measures for sealing the interior of the tube extension, a penetration of moisture or other gases can not be completely eliminated. Due to temperature influences, it is also possible to experience outgasings of the internal parts or e.g. the adhesive. By condensation of the gases or moisture, an electrically conductive connection can then arise, in the form of a condensate bridge between the transmitting and receiving lines, via which the transmitted signal can affect the received signal. This can even lead to total failure of the measuring device. Such condensate bridges can be especially damaging to the plug connections needed for technical, manufacturing reasons near the electronics of the control/evaluation unit and, on the other end, near the driver/receiver unit. These plug connections can not be potted, such as is done e.g. in the case of the driver/receiver unit itself. A problem of a condensate bridge between transmitting and receiving lines is that the transmitted signal can leak, or crosstalk, onto the receiving line and, therefore, can disturb the received signal.

SUMMARY OF THE INVENTION

An object of the invention is to minimize the effects of a condensate bridge between transmitting and receiving lines.

The object is achieved according to the invention by providing at least a third line, which is constructed and arranged in such a manner that it is located between the transmitting and receiving lines and is connected with a voltage source having an output impedance smaller than the impedance of a condensate bridge between transmitting and receiving lines.

First of all, this prevents that a condensate bridge can even create a direct electrical connection between transmitting and receiving lines. A condensate bridge can then arise only between transmitting line and third line or between receiving line and third line. If a condensate bridge connects all three lines, then this is divided-up into the two aforementioned cases. Because the third line is connected to a voltage source whose output impedance is smaller than the impedance of a condensate bridge, it is not possible for there to be a direct effect of the transmitted signal on the received signal. So, what happens in the two possibilities? The third line is, per the invention, connected with a voltage source with an output impedance smaller than the impedance of a possible condensate bridge. In order to achieve this, the output impedance should be as small as possible. The value should be at least in the range of the output impedance of the voltage source, to which the transmitting line is connected. In the case of the connection between the transmitting line and the third line, the transmitting signal is scarcely influenced, when the transmitted signal is coming from a voltage source with low output impedance and the condensate bridge has a high resistance. If the receiving line and the third line are connected together by a condensate bridge, then the received signal is, it is true, possibly weakened, but the great advantage results that there is no direct contact with the transmitting line.

An advantageous embodiment provides that the third electric line is a shielding of the receiving line. In such case, the receiving line is always surrounded by the third line. Additionally, there is also the advantage of a shielding as protection against incoming radiations and as protection of other lines in front of the shielded line.

An embodiment provides that the voltage source with which the third line is connected produces a constant voltage. The value of the voltage, or potential, can, in such case, be set arbitrarily. It is only necessary to assure that the output impedance of the voltage source is as small as possible.

An embodiment provides that the voltage source with which the third line is connected is ground. The impedance of the voltage source ground is thus generally smaller than that of a condensate bridge. Additionally, such embodiment is very easy to put in place. A problem, however, is that the third line and the receiving line are not at the same potential. As a result, the line capacitance weakens the received signal. Consequently, this embodiment can still be improved.

An embodiment provides that the voltage source with which the third line is connected produces a voltage which varies with time. The kind of variation with time is of concern in the next embodiment.

An advantageous embodiment includes that the voltage source with which the third line is connected is an electronics unit with low output impedance, which is embodied in such a manner that the third line lies at the same potential as the receiving line. The third line thus lies at a so-called guard potential. The electronics unit is, for example, an operational amplifier, which, in turn, has a low output impedance.

Since, thus, the receiving line and the third line lie at the same potential, no current can flow through a condensate bridge between the two lines to weaken the received signal. Additionally, no loss can arise thereby for the received signal through the line capacitance. Therefore, this embodiment represents a marked improvement compared with placing the third line at ground. The effort for the electronics unit is also relatively small, especially compared with the advantage that results from a less disturbed, received signal.

An embodiment provides that the driver/receiver unit includes at least one piezoelectric element. A further embodiment provides that the driver/receiver unit has exactly one piezoelectric element. These piezoelectric elements have high output impedances.

BRIEF DESCRIPTION OF THE DRAWINGS

The invention will now be explained in greater detail on the basis of the drawings, the figures of which show as follows.

DESCRIPTION OF THE PREFERRED EMBODIMENTS

Figure 1:
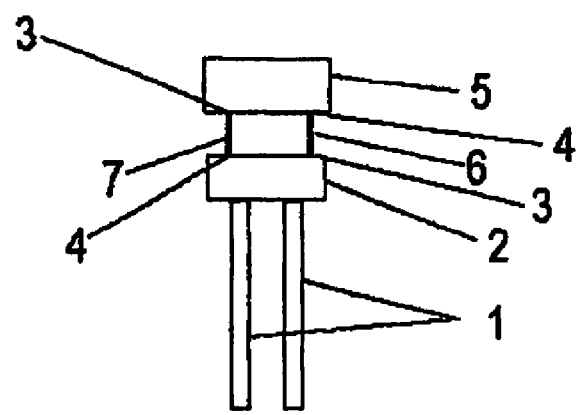
FIG. 1 a block diagram of the measuring device, without the third line of the invention.

FIG. 1 shows a block diagram of the apparatus for measuring and/or monitoring a physical or chemical variable, e.g. the fill level of a medium. In the shown example, the oscillatable unit 1 is a tuning fork, such as used in the Liquiphant instrument available from the assignee. The oscillatable unit is excited to oscillate by the driver/receiver unit 2. For this, by way of example, a piezoelectric element, or a stack of such elements, can be excited to oscillate by the application of a voltage. The oscillations are then transferred to the oscillatable unit 1 via a suitable membrane, or diaphragm. The driver/receiver unit 2 also receives the oscillations of the oscillatable unit 1, which it converts into electrical signals. The frequency and amplitude of the oscillations depend, for example, on whether the oscillatable unit 1 is oscillating freely in air or, instead, is contacted by the medium. The driver/receiver unit 2 is connected with the control/evaluation unit 5. The control/evaluation unit has, on the one hand, the job of evaluating the oscillations of the oscillatable unit 1 and of issuing statements on the basis thereof, e.g. concerning the fill level of a medium. On the other hand, it is also present to couple the oscillations back through a back-coupling electronics, i.e. for maintaining the oscillations. Extending between the driver/receiver unit 2 and the control/evaluation unit 5 are two electric lines 6, 7, which connect the respective outputs 4 and inputs 3 together.

Figure 2:
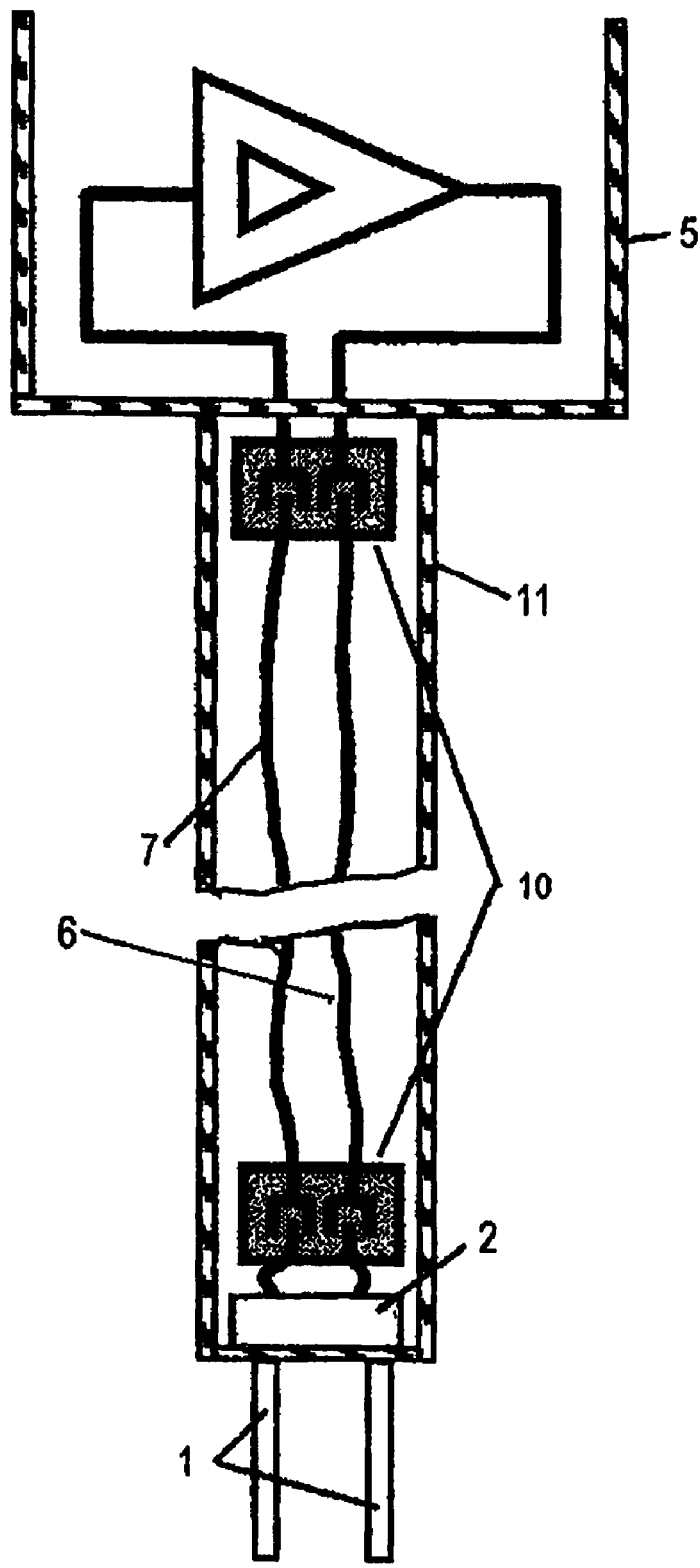
FIG. 2 a detailed block diagram of the measuring device with tube extension.

FIG. 2 shows a detailed block diagram. One sees the two lines 6, 7 in the tube 11. The connecting of the lines 6, 7 with the driver/receiver unit 2 and the control/evaluation unit 5 is done with plug connections 10. In the control/evaluation unit 5, there is, in this instance, by way of example, only one back-coupling unit. Since the lines 6, 7 are usually insulated, a condensate cannot produce a bridge. In the region of the plug connections 10, it is, however, possible, that a condensate can form a bridge between the lines 6, 7. These plug connections 10 are usually not potted. Thus, condensate bridges occur either at the transition from the driver/receiver unit 2 to the lines 6, 7 or between control/evaluation unit 5 and lines 6, 7. The penetration of moisture or gases cannot always be avoided, since this can happen e.g. under conditions of cycled heating and cooling. Outgasing of the internal components or e.g. the adhesive are likewise possible.

Figure 3:
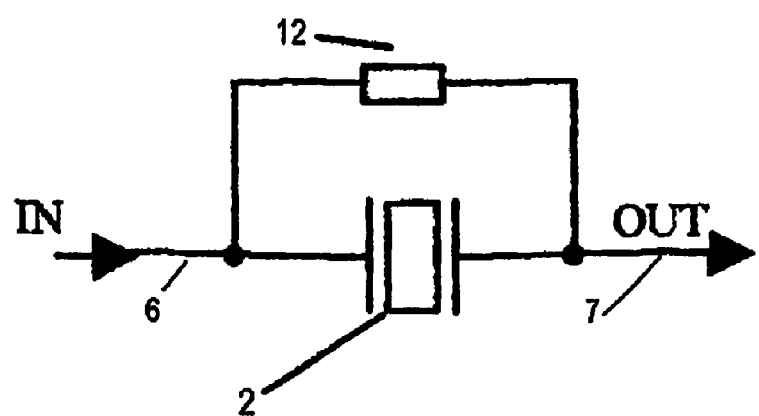
FIG. 3 an equivalent circuit for a condensate bridge without third line.

FIG. 3 shows an equivalent circuit for a condensate bridge connecting the transmitting line 6 (IN) with the receiving line 7 (OUT). Between the two lines, a piezoelectric element is drawn here for the driver/receiver unit 2. Such elements usually have very high output impedances. The condensate bridge acts as a resistor 12, via which the transmitting line 6 is connected directly with the receiving line 7, so that, among other things, there is a superpositioning of the two signals. It is also possible that, because of this condensate bridge, the oscillation frequency changes in a manner such that the control/evaluation unit 5 switches over to cutoff frequency, so that the measuring device no longer functions.

Figure 4:
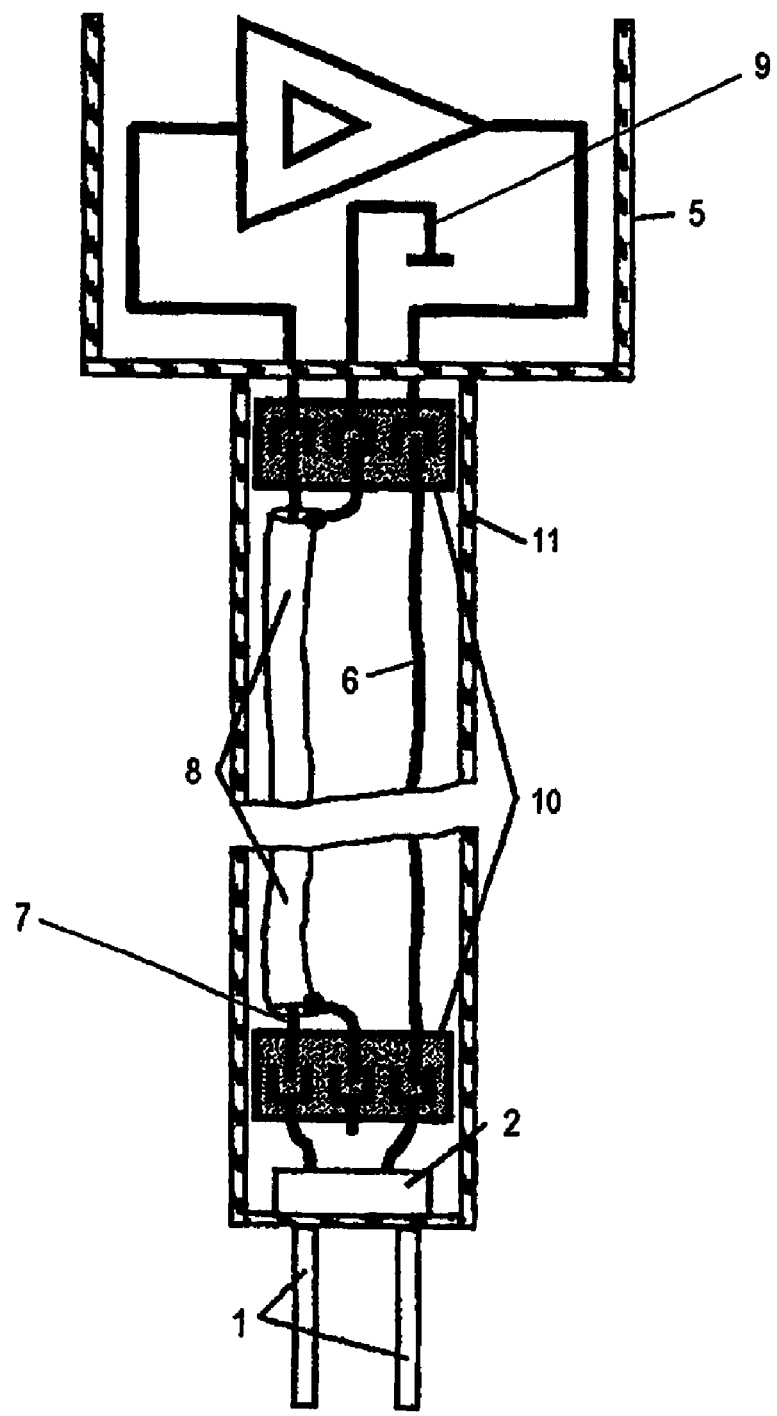
FIG. 4 a block diagram of the measuring device with third line connected to ground.

FIG. 4 shows the third line 8 as shielding of the receiving line 7. Additionally in this embodiment, the voltage source 9 is ground. Consequently, the impedance of the voltage source 9, to which the third line 8 is attached, is, in general, smaller than the impedance of a condensate bridge. I.e., a direct connection between transmitting line 6 and receiving line 7 is not present, since, between the two, is the third line 8, which lies at an output impedance, which is significantly smaller than the impedance of the condensate bridge. The effect of a condensate bridge is, thus, that, essentially, a voltage divider is formed, which reduces the voltage of the received signal. The embodiment as shielding also incorporates the usual advantages of a shielding. The protection of the shielded, receiving line 7 against stray radiation is, however, more relevant in the case of embodiments in which the tube extension 11 is not of metal. The connection to ground is very easy to implement; however, then the receiving line 7 and the third line 8 lie at different potentials, whereby the line capacitance, as capacitive reactance between receiving line and shielding, becomes noticeable in terms of a reduction of the received signal. In the case of long tube extensions 11, the capacitance of this capacitor of receiving line 7 and third line 8 can, above all, become very large. Thus, the third line 8 and ground as voltage source 9 do, it is true, help against the effects of the condensate bridge, but capacitive losses are experienced.

Figure 5:
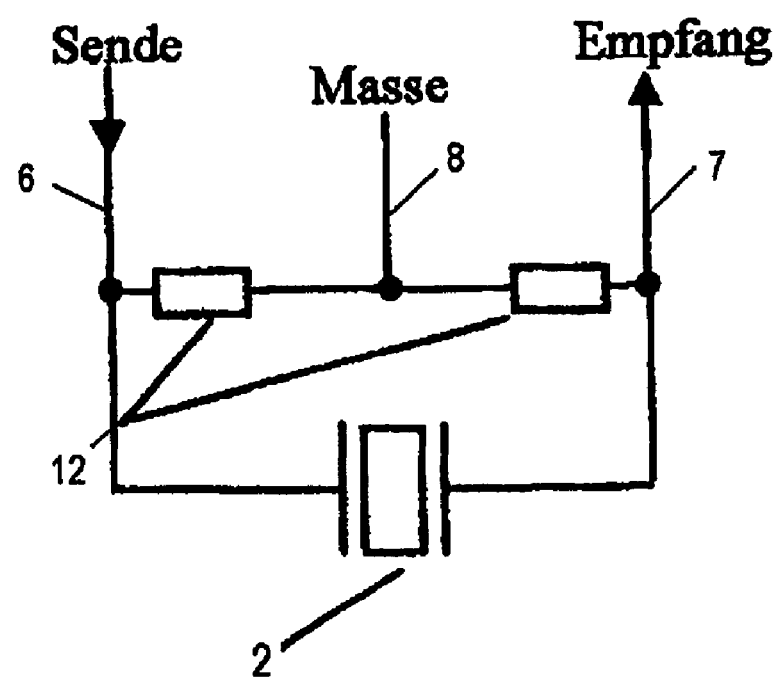
FIG. 5 an equivalent circuit for a condensate bridge with third line connected to ground.

FIG. 5 shows the effect of a condensate bridge between transmitting line 6 and receiving line 7 for the embodiment in FIG. 4. In this case, two resistances 12 result, between which the third line 8 lies at ground. Therefore, there is no direct action of the transmitting line 6 on the receiving line 7. Since the receiving line 7 and the third line 8 are at different potentials, the received signal is weakened by current flow.

Figure 6:
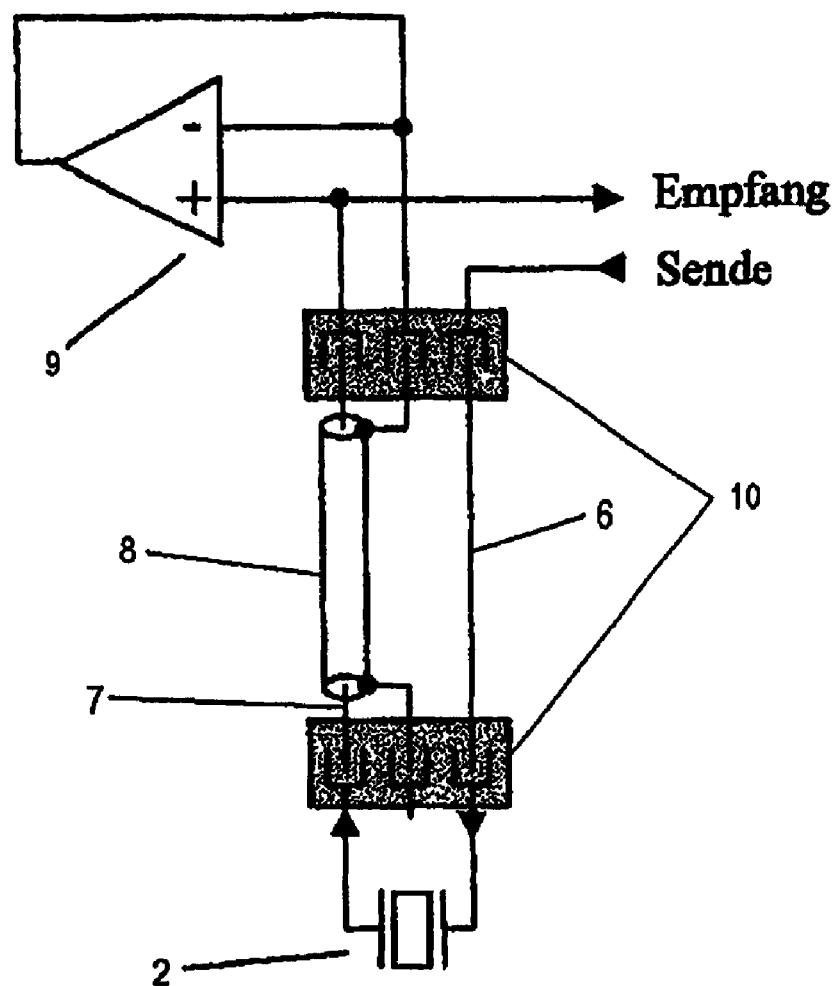
FIG. 6 a block diagram of the measuring device with third line at a guard potential.

FIG. 6 shows the embodiment, in which the third line 8 lies at a guard potential. The third line thus lies always at the same potential as the receiving line 7. The voltage source 9 is here e.g. an operational amplifier with a correspondingly low output impedance. The effects of a condensate bridge on the receiving line 7 are thus still minimized. Simultaneously, there are now no capacitive reactances between the receiving line 7 and the third line 8, since the two lines lie at the same potential. The low output impedance thus reduces the direct effects of the condensate bridge and, by suitable choice of the potential, at which the third line is lying, the occurrence of capacitive effects can be avoided.

The invention claimed is:

1. An apparatus for measuring and/or monitoring a physical or chemical process variable of a medium, comprising:
   an oscillatable unit;
   a driver/receiver unit, which has at least one signal input and one signal output,
   and which excites said oscillatable unit to oscillate, and/or which receives its oscillations;
   a control/evaluation unit, which has at least one signal input and one signal output, which controls said driver/receiver unit, and/or which evaluates the oscillations of said oscillatable unit;
   at least one transmitting line and one receiving line between said control/evaluation unit and said driver/receiver unit; and at least a third line, wherein:
   said one transmitting line is connected with said one signal output of said control/evaluation unit and said at least one signal input of said driver/receiver unit,
   said one receiving line is connected with said one signal output of said driver/receiver unit and said at least one signal input of said control/evaluation unit; and
   said transmitting line and said receiving line, are connected with said control/evaluation unit and with said driver/receiving unit via plug connectors;
   said third line is embodied and arranged in a manner such that it is located in the region of said plug connectors between said one transmitting line and said one receiving line, and is connected with a voltage source, which has an output impedance which is smaller than the impedance of a condensate bridge in said region of said plug connectors between said one transmitting line and said one receiving line; and
   the voltage source, with which said third line is connected, is an electronics unit with low output impedance, which is embodied in a manner such that said third line lies at the same potential as said one receiving line.

2. The apparatus as claimed in claim 1, wherein:
said third line is a shielding of said one receiving line.

3. The apparatus as claimed in claim 1, wherein:
the voltage source, with which said third line is connected, produces a constant potential.

4. The apparatus as claimed in claim 1, wherein:
the voltage source, with which said third line is connected, produces a potential which varies with time.

5. The apparatus as claimed in claim 1, wherein:
said driver/receiver unit has at least one piezoelectric element.

6. The apparatus as claimed in claim 1, wherein:
said driver/receiver unit has exactly one piezoelectric element.

* * * * *